US012671480B2

(12) United States Patent　　　(10) Patent No.: US 12,671,480 B2
Åström et al.　　　　　　　　　　(45) Date of Patent: Jun. 30, 2026

(54) CHANNEL INFORMATION ESTIMATION FOR COMMUNICATION NETWORKS WITH META-SURFACES

(71) Applicant: Telefonaktiebolaget LM Ericsson (publ), Stockholm (SE)

(72) Inventors: Magnus Åström, Lund (SE); Bengt Lindoff, Bjärred (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 345 days.

(21) Appl. No.: 18/549,002

(22) PCT Filed: Mar. 8, 2021

(86) PCT No.: PCT/EP2021/055789
§ 371 (c)(1),
(2) Date: Sep. 5, 2023

(87) PCT Pub. No.: WO2022/063435
PCT Pub. Date: Mar. 31, 2022

(65) Prior Publication Data
US 2024/0162960 A1　　May 16, 2024

(51) Int. Cl.
H04B 7/06 (2006.01)
(52) U.S. Cl.
CPC .......... H04B 7/0632 (2013.01); H04B 7/0617 (2013.01)
(58) Field of Classification Search
CPC ............................ H04B 7/0632; H04B 7/0617
See application file for complete search history.

(56) References Cited

U.S. PATENT DOCUMENTS 10,419,948 B1　　9/2019　Labadie et al.
11,777,206 B2 *　10/2023　Zhu ....................... H04B 7/0617
　　　　　　　　　　　　　　　　　　　375/267

(Continued)

FOREIGN PATENT DOCUMENTS

EP　　　3439107 A1　　2/2019
EP　　　3962006 A1 *　3/2022　........... H04B 7/0617

(Continued)

OTHER PUBLICATIONS

International Search Report and Written Opinion dated Dec. 1, 2021 for International Application No. PCT/EP2021/055789 filed Mar. 8, 2021; consisting of 9 pages.

(Continued)

*Primary Examiner* — David Bilodeau
(74) *Attorney, Agent, or Firm* — Weisberg I.P. Law, P.A.

(57) ABSTRACT

Mechanisms for performing a channel information estimation procedure. A method is performed by a network node. The network node serves a user equipment via a meta-surface over a radio propagation channel. The method includes performing the channel information estimation procedure. The channel information estimation procedure involves compensation for configurations used by the meta-surface. The compensation pertains to estimation of channel quality of the radio propagation channel between the user equipment and the network node via the meta-surface. The method includes performing a data transmission over the radio propagation channel. The data transmission is performed with transmission settings as determined by the channel information estimation procedure.

17 Claims, 9 Drawing Sheets

(56)                    References Cited

U.S. PATENT DOCUMENTS

| | | | | |
|---|---|---|---|---|
| 11,843,171 | B2 * | 12/2023 | Saab | .................. H04B 7/04013 |
| 2011/0244786 | A1 | 10/2011 | Fujii et al. | |
| 2016/0233971 | A1 | 8/2016 | Fink et al. | |
| 2019/0044246 | A1 | 2/2019 | Pitsillides et al. | |
| 2019/0181920 | A1 | 6/2019 | Rofougaran et al. | |
| 2024/0154646 | A1 * | 5/2024 | Wang | ................... H01Q 19/104 |
| 2024/0154647 | A1 * | 5/2024 | Elshafie | .................... H04L 5/14 |

FOREIGN PATENT DOCUMENTS

| | | |
|---|---|---|
| GB | 2489282 A | 9/2012 |
| KR | 20170025422 A | 3/2017 |
| WO | 2014104954 A1 | 7/2014 |

OTHER PUBLICATIONS

Wu, Q., et al.; Intelligent Reflecting Surface Enhanced Wireless Network via Joint Active and Passive Beamforming; IEEE Transactions on Wireless Communications; vol. 18, No. 11, Aug. 23, 2019; consisting of 16 pages.

Di Renzo, M., et al.; Smart Radio Environments Empowered by AI Reconfigurable Meta-Surfaces: An Idea Whose Time Has Come; Mar. 21, 2019; consisting of 32 pages.

Yuan, X., et al.; Reconfigurable-Intelligent-Surface Empowered Wireless Communications: Challenges and Opportunities; Aug. 17, 2020; consisting of 7 pages.

Gopi, S., et al.; Intelligent Reflecting Surface Assisted Beam Index-Modulation for Millimeter Wave Communication; IEEE Transactions on Wireless Communications, vol. 20, No. 2, Oct. 15, 2020; consisting of 14 pages.

International Search Report and Written Opinion dated Feb. 2, 2021 for International Application No. PCT/EP2020/065081 filed May 29, 2020; consisting of 10 pages.

Zhang, L., et al., Augmenting Transmission Environments for Better Communications: Tunable Reflector Assisted MmWave WLANs, IEEE Transactions on Vehicular Technology, vol. 69, No. 7, Apr. 30, 2020, consisting of 13 pages.

Nadeem, Q., et al., Intelligent Reflecting Surface Assisted Wireless Communication: Modeling and Channel Estimation, Dec. 13, 2019, consisting of 7 pages.

Zhang, Q., et al., Millimeter Wave Communications with an Intelligent Reflector: Performance Optimization and Distributional Reinforcement Learning, Feb. 24, 2020, consisting of 30 pages.

3GPP TS 36.331 V16.2.1, 3rd Generation Partnership Project; Technical Specification Group Radio Access Network; Evolved Universal Terrestrial Radio Access (E-UTRA); Radio Resource Control (RRC); Protocol specification (Release 16); Sep. 2020; consisting of 1081 pages.

International Search Report and Written Opinion dated Jul. 1, 2021 for International Application No. PCT/EP2020/078388 filed on Oct. 9, 2020, consisting of 9 pages.

* cited by examiner

--PRIOR ART--

S401
Configure meta-surface with first configuration

S402
Transmit reference signals

S403
Receive CQI report

S404
Determine transmission settings

S405
Configure meta-surface with second configuration

S406
Transmit data packet to user equipment

S501
Signal first reflection capability

S502
Signal second reflection capability

S503
Receive configuration to apply first configuration

S504
Configure meta-surface according to first configuration

S505
Receive configuration to apply second configuration

S506
Configure meta-surface according to second configuration

CHANNEL INFORMATION ESTIMATION FOR COMMUNICATION NETWORKS WITH META-SURFACES

CROSS-REFERENCE TO RELATED APPLICATION

This application is a Submission Under 35 U.S.C. § 371 for U.S. National Stage Patent Application of International Application Number: PCT/EP2021/055789, filed Mar. 8, 2021 entitled "CHANNEL INFORMATION ESTIMATION FOR COMMUNICATION NETWORKS WITH META-SURFACES," the entirety of which is incorporated herein by reference.

TECHNICAL FIELD

Embodiments presented herein relate to methods, a network node, a user equipment, a computer program, and a computer program product for performing a channel information estimation procedure.

BACKGROUND

Millimeter waves (mmWaves) corresponding to carrier frequencies above 10 GHz have been introduced for the new radio (NR) air interface as used in fifth generation (5G) telecommunication systems. However, communication over mmWaves are sensible to blocking, i.e. physical objects blocking the radio waves. A non-limiting example illustrating blocking and its effects will now be disclosed with reference to FIG. 1. FIG. 1 shows an example of a communications network 100a. The communication network 100a comprises a network node 200 (for example provided as a (radio) access network node) that is configured to provide network access to user equipment, two of which are shown at reference numerals 300a, 300b. The signal path, corresponding to communication channel 140a, between network node 200 and the user equipment 300a, 300b is blocked by a first physical object 160a.

One technique enabling the creation of smart radio environments involves the use of surfaces that can interact with the radio environment. As disclosed in, for example, "*Smart Radio Environments Empowered by AI Reconfigurable Meta-Surfaces: An Idea Whose Time Has Come*" by Marco Di Renzo et al., as accessible on https://arxiv.org/abs/1903.08925 (latest accessed 20 Sep. 2020), "*Reconfigurable-Intelligent-Surface Empowered Wireless Communications: Challenges and Opportunities*" by Xiaojun Yuan et al., as accessible on https://arxiv.org/abs/2001.00364 (latest accessed 12 Feb. 2021), and "*Intelligent Reflecting Surface Enhanced Wireless Network via Joint Active and Passive Beamforming*" by Q. Wu and R. Zhang, in IEEE Transactions on Wireless Communications, vol. 18, no. 11, pp. 5394-5409, Nov. 2019, doi: 10.1109/TWC.2019.2936025 such surfaces are commonly called meta-surfaces, reconfigurable intelligent surfaces, large intelligent surfaces, or intelligent reconfigurable surfaces. Without loss of generality or discrimination between these terms, the term meta-surface will be used throughout this disclosure.

A meta-surface is an electromagnetic surface made of electromagnetic material that is engineered in order to exhibit properties that are not found in naturally occurring materials. A meta-surface is, in practice, an electromagnetic discontinuity, which can be defined as a complex electromagnetic structure that is typically deeply sub-wavelength in thickness, is electrically large in transverse size, and is composed of sub-wavelength scattering particles with extremely small features. In simple terms, a meta-surface is made of a two-dimensional array of sub-wavelength metallic or dielectric scattering particles that transform incoming electromagnetic waves in different ways, thus causing the electromagnetic waves to be reflected in accordance with the structure of the meta-surface.

In further detail, a passive meta-surface is a meta-surface in which the scattering particles or the electromagnetic reflective properties are not fixed and engineered at the manufacturing phase but can be modified depending on external stimuli that is provided to the meta-surface. In this disclosure the external stimuli is defined by a control signal from a reflection node that is operatively connected to the meta-surface. In one example the passive meta-surface consists of arrays of passive patch antennas. That is, the antennas are not connected to active radio transceivers (i.e., devices capable to modulate data streams up to radio frequency and demodulate radio frequencies to data streams). Instead, the antennas in the array are connected to resistors, inductors, and/or capacitors of which the electrical impedance is controllable, and where the antennas are connected to the resistors, inductors, and/or capacitors towards a ground plane such that the reflection phase of respective antenna can be adapted based on electrical impedance setting.

Thus, by controlling the electrical impedances of the respective patch antennas, the reflection angle of an incoming electromagnetic wave can be adapted according to the generalized Snell's law. One difference between a regular surface and a passive meta-surface thus lies in the capability of the passive meta-surface of shaping, or reflecting, incoming electromagnetic waves, such as radio waves, according to the generalized Snell's laws of reflection and refraction. For example, the angles of incidence and reflection of the radio waves are not necessarily the same in a passive meta-surface.

Thus, with reference back to the example of FIG. 1, if object 160b is provided with a passive meta-surface 120, the reflection of the signal via physical object 160b could be controlled such that the signal does reach the user equipment 300a, 300b via a non-line of sight signal paths corresponding to communication channel 140b in beams 150a and 150b. In this respect, whereas communication channel 140a is illustrated as a simple line, communication channel 140b is illustrated in terms of two beams 150a and 150b; one beam 150a between the network node 200 and the meta-surface 120, and one beam 150b between the meta-surface 120 and the user equipment 300a, 300b.

For maximizing spectral capacity in the communication between the node 200 and the user equipment 300a, 300b, each user equipment 300a, 300b estimates the channel quality and reports a channel quality information (CQI) report to the network node 200. The network node 200 might then adapt transmission parameters for optimized communication to each individual user equipment 300a, 300b. The same principles for optimized communication via CQI reporting might be used also in case the communication is made via a meta-surface 120 as described above. For such optimized communication it might be advantageous to communicate with the user equipment 300a, 300b in direction beams, one beam per user equipment 300a, 300b. This is illustrated in the communications network 100b of FIG. 2. The communications network 100b comprises the same components as communications network 100a but in FIG. 2 the communication channel 140b as illustrated in terms of two beams 150a, 150b in FIG. 1 now has been replaced by two communication channels 140c, 140d, where the two communication channels 140c, 140d are the same in beam 150a, along the path between the network node 200 and the meta-surface 120, but where there is a separate beam 150c, 150d for each communication channel 140c, 140d along the path between the meta-surface 120 and each user equipment 300a, 300b. In order to change from communication channel 140b to communication channels 140c, 140d, settings that affect the reflection angle and/or beamforming properties at the meta-surface 120 are changed. However, the CQI report might not be valid for the thus changed reflection angle and/or beamforming properties at the meta-surface 120.

Hence, there is a need for improved CQI reporting in communication networks where meta-surfaces are used.

SUMMARY

An object of embodiments herein is to address the above issues by providing techniques for efficient channel information estimation in communication networks where meta-surfaces are used.

According to a first aspect there is presented a method for performing a channel information estimation procedure. The method is performed by a network node. The network node serves a user equipment via a meta-surface over a radio propagation channel The method comprises performing the channel information estimation procedure. The channel information estimation procedure involves compensation for configurations used by the meta-surface. The compensation pertains to estimation of channel quality of the radio propagation channel between the user equipment and the network node via the meta-surface. The method comprises performing a data transmission over the radio propagation channel The data transmission is performed with transmission settings as determined by the channel information estimation procedure.

According to a second aspect there is presented a network node for performing a channel information estimation procedure. The network node is configured to serve a user equipment via a meta-surface over a radio propagation channel The network node comprises processing circuitry. The processing circuitry is configured to cause the network node to perform the channel information estimation procedure. The channel information estimation procedure involves compensation for configurations used by the meta-surface. The compensation pertains to estimation of channel quality of the radio propagation channel between the user equipment and the network node via the meta-surface. The processing circuitry is configured to cause the network node to perform a data transmission over the radio propagation channel The data transmission is performed with transmission settings as determined by the channel information estimation procedure.

According to a third aspect there is presented a network node for performing a channel information estimation procedure. The network node is configured to serve a user equipment via a meta-surface over a radio propagation channel The network node comprises a channel estimation module configured to perform the channel information estimation procedure. The channel information estimation procedure involves compensation for configurations used by the meta-surface. The compensation pertains to estimation of channel quality of the radio propagation channel between the user equipment and the 35 network node via the meta-surface. The network node comprises a data transmission module configured to perform a data transmission over the radio propagation channel The data transmission is performed with transmission settings as determined by the channel information estimation procedure.

According to a fourth aspect there is presented a computer program for performing a channel information estimation procedure. The computer program comprises computer program code which, when run on processing circuitry of a network node, causes the network node to perform a method according to the first aspect.

According to a fifth aspect there is presented a method for performing a channel information estimation procedure. The method is performed by a user equipment. The user equipment is served by a network node via a meta-surface over a radio propagation channel The method comprises obtaining, as part of performing the channel information estimation procedure with the network node, a compensation indicator to be used by the user equipment during the channel information estimation procedure. The channel information estimation procedure involves compensation, based on the compensation indicator, for configurations used by the meta-surface. The compensation pertains to estimation of channel quality of the radio propagation channel between the user equipment and the network node via the meta-surface. The method comprises receiving a data transmission from the network node via the meta-surface.

According to a sixth aspect there is presented a user equipment for performing a channel information estimation procedure. The user equipment is configured to be served by a network node via a meta-surface over a radio propagation channel The user equipment comprises processing circuitry. The processing circuitry is configured to cause the user equipment to obtain, as part of performing the channel information estimation procedure with the network node, a compensation indicator to be used by the user equipment during the channel information estimation procedure. The channel information estimation procedure involves compensation, based on the compensation indicator, for configurations used by the meta-surface. The compensation pertains to estimation of channel quality of the radio propagation channel between the user equipment and the network node via the meta-surface. The processing circuitry is configured to cause the user equipment to receive a data transmission from the network node via the meta-surface.

According to a seventh aspect there is presented a user equipment for performing a channel information estimation procedure. The user equipment is configured to be served by a network node via a meta-surface over a radio propagation channel The user equipment comprises an obtain module configured to obtain, as part of performing the channel information estimation procedure with the network node, a compensation indicator to be used by the user equipment during the channel information estimation procedure. The channel information estimation procedure involves compensation, based on the compensation indicator, for configurations used by the meta-surface. The compensation pertains to estimation of channel quality of the radio propagation channel between the user equipment and the network node via the meta-surface. The user equipment comprises a receive module configured to receive a data transmission from the network node via the meta-surface.

According to an eighth aspect there is presented a computer program for performing a channel information estimation procedure, the computer program comprising computer program code which, when run on processing circuitry of a user equipment, causes the user equipment to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, these aspects provide efficient CQI reporting in communication networks where meta-surfaces are used.

Advantageously, these aspects address the above issues and provide techniques for efficient channel information estimation in communication networks where meta-surfaces are used.

Advantageously, by introducing compensation as part of the channel information estimation, the communication between the network node and each user equipment in a communication network where a meta-surface is used can be optimized, thereby improving throughput and system capacity, etc.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above, there is a need for improved CQI reporting in communication networks where meta-surfaces are used.

An object of embodiments herein is therefore to address these above issues by providing techniques for efficient channel information estimation in communication networks where meta-surfaces are used.

The embodiments disclosed herein in particular relate to mechanisms for performing a channel information estimation procedure. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a user equipment 300a, 300b, a method performed by the user equipment 300a, 300b, and a computer program product comprising code, for example in the form of a computer program, that when run on processing circuitry of the user equipment 300a, 300b, causes the user equipment 300a, 300b to perform the method.

Figure 3:
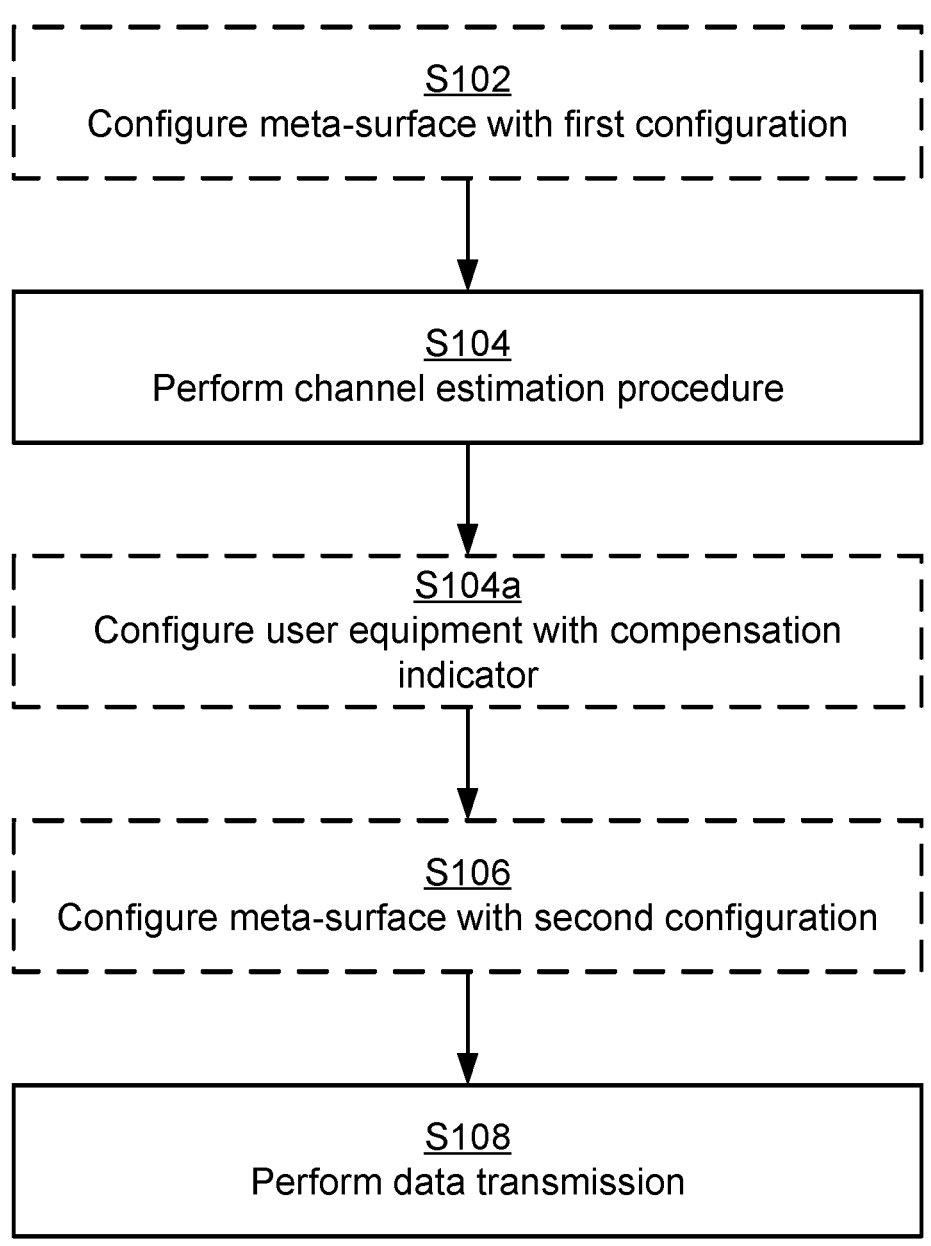
FIGS. 3, 4, 7, 8, and 9 are flowcharts of methods according to embodiments.

Reference is now made to FIG. 3 illustrating a method for performing a channel information estimation procedure as performed by the network node 200 according to an embodiment. The network node 200 serves at least one user equipment 300a, 300b via a meta-surface 120 over a radio propagation channel S104: The network node 200 performs the channel information estimation procedure. The channel information estimation procedure involves compensation for configurations used by the meta-surface 120. The compensation pertains to estimation of channel quality of the radio propagation channel between the user equipment 300a, 300b and the network node 200 via the meta-surface 120.

S108: The network node 200 performs a data transmission over the radio propagation channel The data transmission is performed with transmission settings as determined by the channel information estimation procedure.

Advantageously, this method provides efficient CQI reporting in communication networks 100a, 100b where meta-surfaces 120 are used.

Advantageously, this method addresses the above issues and provides techniques for efficient channel information estimation in communication networks 100a, 100b where meta-surfaces are used.

Advantageously, by introducing compensation as part of the channel information estimation, the communication between the network node 200 and each user equipment 300a, 300b in a communication network 100a, 100b where a meta-surface 120 is used can be optimized, thereby improving throughput and system capacity, etc.

Embodiments relating to further details of performing a channel information estimation procedure as performed by the network node 200 will now be disclosed.

There might be different configurations used by the meta-surface 120. Details relating thereto will now be disclosed. In some embodiments, the configurations pertain to settings of reflection angle or gain factor of the meta-surface 120. In some aspects, the network node 200 configures the meta-surface 120 with configurations and communicates with the user equipment 300a, 300b whilst the meta-surface 120 is configured with different configurations. In particular, in some embodiments, the configurations comprise a first configuration and a second configuration, and the network node 200 is configured to perform (optional) steps S102 and S106:

S102: The network node 200 configures the meta-surface 120 with the first configuration. The channel information estimation procedure is then performed whilst the meta-surface 120 is configured to use the first configuration.

S106: The network node 200 configures the meta-surface 120 with the second configuration. The data transmission is then performed whilst the meta-surface 120 is configured to use the second configuration.

In some non-limiting examples, the first configuration yields a first angular coverage of the meta-surface 120, the second configuration yields a second angular coverage of the meta-surface 120, and the first angular coverage is wider than the second angular coverage.

There might be different types of compensation performed as part of the channel information estimation procedure. Details relating thereto will now be disclosed. In some embodiments, the compensation is based on a difference between the first configuration and the second configuration. Further, in some embodiments, the compensation pertains to a difference, with respect to the first configuration and the second configuration, in signal pathloss between the network node 200 and the user equipment 300a, 300b or in signal power density received by the user equipment 300a, 300b.

There might be different ways for network node 200 to perform the compensation for the configurations used by the meta-surface 120. Details relating thereto will now be disclosed.

In some aspects the compensation for the configurations used by the meta-surface 120 is by the network node 200 performed by configuring the user equipment 300a, 300b with a compensation indicator. That is, in some embodiments, the network node 200 is configured to perform (optional) step S104a to compensate for the configurations used by the meta-surface 120:

S104a: The network node 200 configures the user equipment 300a, 300b with a compensation indicator to be used by the user equipment 300a, 300b during the channel information estimation procedure.

There could be different types of compensation indicators. Details relating thereto will now be disclosed.

In some aspects, the network node 200 configures the user equipment 300a, 300b with an offset value for CQI reports. In particular, in some embodiments, the compensation indicator is an offset value to a CQI value to be reported by the user equipment 300a, 300b during the channel information estimation procedure.

There could be different ways for the offset value to be determined. Details relating thereto will now be disclosed.

In some embodiments, the offset value is dependent on signal pathloss between the network node 200 and the user equipment 300a, 300b.

In this respect, for a user equipment 300a, 300b to obtain a CQI value, the user equipment 300a, 300b typically first determines a signal to noise ratio (SNR) estimate, and then based on a look up table (pre-determined, either as a mapping from SNR value to CQI value, or based on experiments in case the mapping is device dependent; typically, the better the SNR value, the higher the CQI value will be) determines a CQI value. The configured offset value might then be a positive (or negative) integer the user equipment 300a, 300b should apply to the CQI obtained from the SNR.

As a non-limiting illustrative example, if the offset value is equal to 2, and CQI=14 is determined based on the SNR, then the CQI value reported from the user equipment 300a, 300b to the network node 200 is 14+2=16.

There could be different ways for the value of the offset value to be determined. Details relating thereto will now be disclosed.

In some aspects, the network node 200 obtains information about properties of the meta-surface 120. The information might specify how the configurations of the meta-surface 120 (such as the first configuration and the second configuration) differently affect the pathloss between the meta-surface 120 and the network node 200 and between the meta-surface 120 and the user equipment 300a, 300b. Depending on how the meta-surface 120 is constructed, the information could either be provided in terms of a configuration dependent scaling of the pathloss equation or a configuration dependent decaying exponent.

In further detail, in some aspects, the pathloss equation could be formulated as:

$$PL_k \sim \frac{\beta_k}{f(r, d, \alpha)},$$

where $PL_k$ denotes the pathloss for configuration k, where $\beta_k$ denotes the configuration dependent reflection factor for configuration k, and where $f$ (r, d, $\alpha$) is a function that describes how the pathloss depends on the distance r between the meta-surface 120 and the network node 200 and on the distance d between the meta-surface 120 and the user equipment 300a, 300b, where $\alpha \geq 2$ is the decaying exponent.

In further detail, in some aspects, the pathloss equation could be formulated as:

$$PL_k \sim \frac{\beta_k}{f(r, d, \alpha_k)},$$

where $PL_k$ denotes the pathloss for configuration k, where $\beta$ denotes the (fixed) reflection factor, and where $f$ (r, d, $\alpha_k$) is a function that describes how the pathloss depends on the distance r between the meta-surface 120 and the network node 200 and on the distance d between the meta-surface 120 and the user equipment 300a, 300b, where $\alpha_k \geq 2$ is the configuration dependent decaying exponent for configuration k. Further aspects of the reflection factor $\beta$ will be disclosed below with reference to FIG. 6.

In some aspects, the information is provided in terms of a configuration dependent scaling of the pathloss equation and the configuration dependent decaying exponent. That is, in some aspects, the pathloss equation could be formulated as:

$$PL_k \sim \frac{\beta_k}{f(r, d, \alpha_k)},$$

with parameters as defined above.

In some aspects, the meta-surface 120 is of a type as selected from a set of types. The pathloss equation might then be pre-determined for each such type and hence assumed to be known by the network node 200 once connected to the meta-surface 120. Then the network node 200, by estimating the distances (i.e., the values of r and d) the network node 200 can obtain configuration dependent pathloss difference, and from that obtain the signal strength difference and hence the offset value for the CQI.

In some aspects, there is a threshold for the compensation. This because the compensation should only apply to the pathloss arising from the path between the meta-surface 120 and the user equipment 300a, 300b. The network node 200 might know (and signal) the expected signal power level $P_{NN}$ at the meta-surface 120 (or its corresponding CQI value, denoted $CQI_{NN}$. The user equipment 300a, 300b might determine a power level $P_{UE}$ (or its corresponding CQI value, denoted $CQI_{UE}$, where $P_{UE}<P_{NN}$ (and hence, $CQI_{UE}<CQI_{NN}$). Correspondingly, the compensation (for example as represented by an offset value γ) should only concern the power difference $P_{NN}-P_{UE}$, or correspondingly CQI levels $CQI_{NN}-CQI_{UE}$ such that the modified CQI, denoted $CQI_{UE,mod}$, as reported by the user equipment becomes, e.g., $CQI_{UE,mod}=CQI_{NN}+γ·(CQI_{NN}-CQI_{UE})$.

As noted above, the meta-surface 120 is of a type as selected from a set of types. The compensation indicator might then indicate which type the meta-surface 120 is.

In some aspects, the compensation is performed by the network node 200 itself. Details relating thereto will now be disclosed. In particular, in some embodiments, performing the channel information estimation procedure involves application of a compensation factor to a value of a CQI report received from the user equipment 300a, 300b during the channel information estimation procedure. The transmission settings are then a function of the value of the CQI report as compensated by the compensation factor. In some embodiments, the compensation factor is dependent on signal pathloss between the network node 200 and the user equipment 300a, 300b. In principle, the compensation factor can be calculated in the same way as the offset value. Particularly, the user equipment 300a, 300b might have signalled capability parameters to the network node 200. For example, the capability parameters might pertain to the number of antennas simultaneously used at the user equipment 300a, 300b, or the combining gain at the user equipment 300a, 300b. This information will enable the network node 200 to know what fraction of the pathloss can be expected to occur before or after reflection of a signal at the meta-surface 120.

As disclosed above, the data transmission in step S108 is performed with transmission settings as determined by the channel information estimation procedure. Non-limiting examples of the transmission settings: modulation and coding scheme (MCS), rank, SNR offset, beamforming parameters, precoding parameters, directivity parameters.

The compensation might be device-specific, such that the compensation is determined per each individual user equipment 300a, 300b. In particular, in some embodiments, the network node 200 is serving at least two user equipment 300a, 300b via the meta-surface 120, and wherein the compensation is determined individually per user equipment 300a, 300b.

Figure 4:
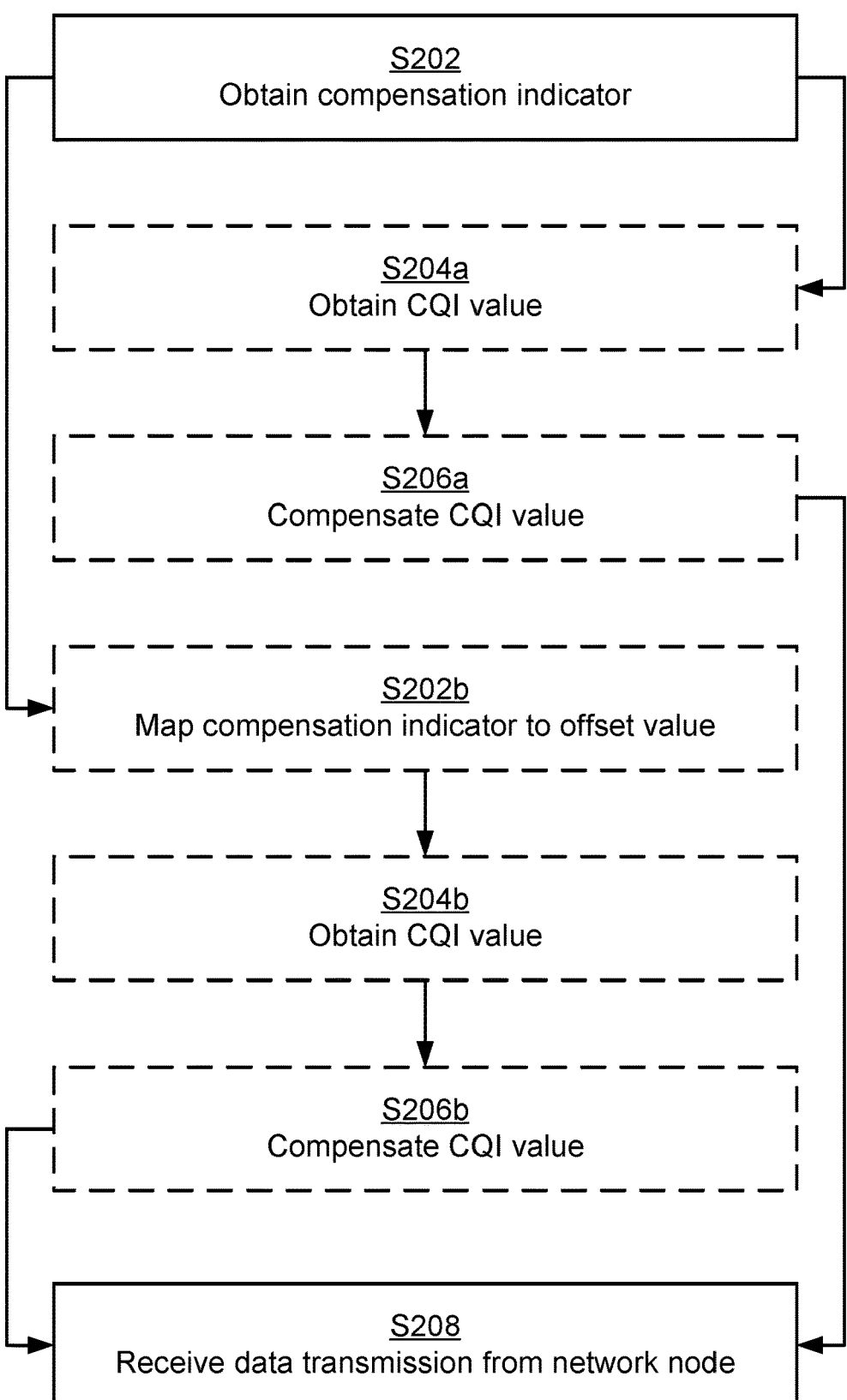

Reference is now made to FIG. 4 illustrating a method for performing a channel information estimation procedure as performed by the user equipment 300a, 300b according to an embodiment. The user equipment 300a, 300b is served by a network node 200 via a meta-surface 120 over a radio propagation channel

S202: The user equipment 300a, 300b obtains, as part of performing the channel information estimation procedure with the network node 200, a compensation indicator to be used by the user equipment 300a, 300b during the channel information estimation procedure. The channel information estimation procedure involves compensation, based on the compensation indicator, for configurations used by the meta-surface 120. The compensation pertains to estimation of channel quality of the radio propagation channel between the user equipment 300a, 300b and the network node 200 via the meta-surface 120.

S208: The user equipment 300a, 300b receives a data transmission from the network node 200 via the meta-surface 120.

Advantageously, this method provides efficient CQI reporting in communication networks 100a, 100b where meta-surfaces 120 are used.

Advantageously, this method addresses the above issues and provides techniques for efficient channel information estimation in communication networks 100a, 100b where meta-surfaces are used.

Advantageously, by introducing compensation as part of the channel information estimation, the communication between the network node 200 and each user equipment 300a, 300b in a communication network 100a, 100b where a meta-surface 120 is used can be optimized, thereby improving throughput and system capacity, etc.

Embodiments relating to further details of performing a channel information estimation procedure as performed by the user equipment 300a, 300b will now be disclosed.

As disclosed above, there could be different types of compensation indicators. As further disclosed above, in some aspects, the network node 200 configures the user equipment 300a, 300b with an offset value for CQI reports. That is, the user equipment 300a, 300b might be configured with an offset value for the CQI reports by the network node 200. In particular, in some embodiments, the compensation indicator is an offset value to a CQI value to be reported by the user equipment 300a, 300b during the channel information estimation procedure. The user equipment 300a, 300b might then be configured to perform (optional) steps S204a and S206a:

S204a: The user equipment 300a, 300b obtains the CQI value from channel measurements performed during the channel information estimation procedure.

S206a: The user equipment 300a, 300b compensates the CQI value with the offset value before reporting the CQI value as compensated to the network node 200.

The thus compensated CQI value is then reported by the user equipment 300a, 300b to the network node 200.

As disclosed above, in some aspects, the meta-surface 120 is of a type from a set of types, and the compensation indicator indicates which type the meta-surface 120 is. The user equipment 300a, 300b might then be configured to perform (optional) steps S202b, S204b and S206b:

S202b: The user equipment 300a, 300b maps the compensation indicator to an offset value.

S204b: The user equipment 300a, 300b obtains the CQI value from channel measurements performed during the channel information estimation procedure.

S206b: The user equipment 300a, 300b compensates the CQI value with the offset value before reporting the CQI value as compensated to the network node 200.

The thus compensated CQI value is then reported by the user equipment 300a, 300b to the network node 200.

Figure 5:
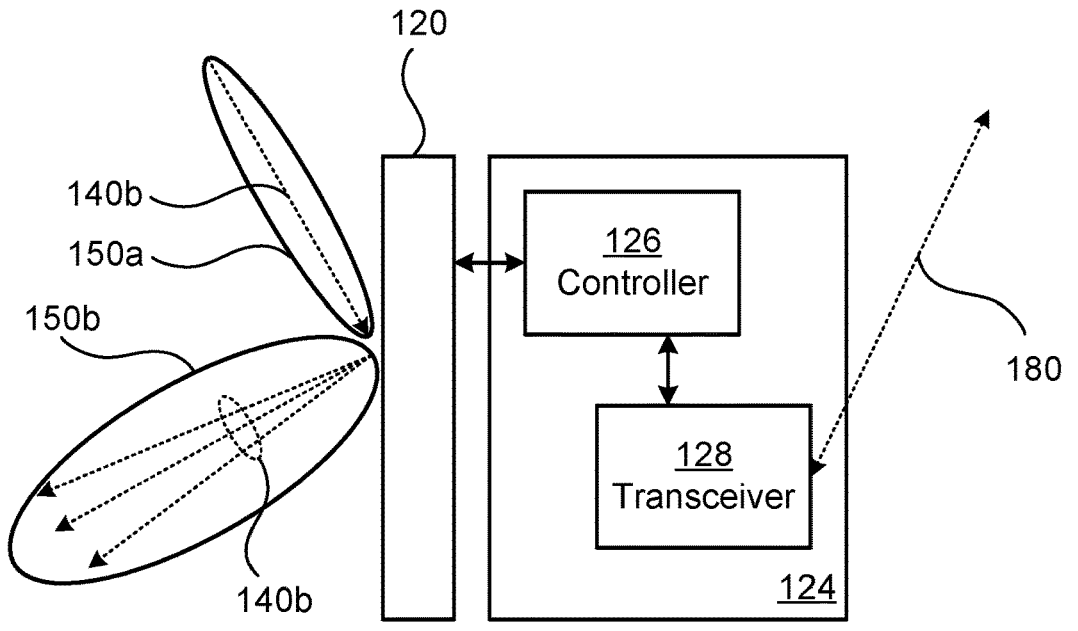
FIG. 5 is a schematic illustration of a meta-surface and a reflection node according to embodiments.

FIG. 5 is a schematic illustration of a meta-surface 120 and a reflection node 124 according to embodiments. The reflection node 124 comprises a controller 126 for controlling the reflection angle of the meta-surface 120 for reflecting radio waves over a communication channel 140b (in beams 150a, 150b) between the network node 200 and the user equipment 300a, 300b. The reflection node 124 comprises a transceiver unit 128 for receiving instructions from the network node 200 over a control channel 180 regarding how the reflection angle of the meta-surface 120 is to be controlled. In further detail, by the controller 126 controlling the impedances of the respective patch antennas, the reflection angle of an incoming radio wave can be adapted according to the generalized Snell's law.

Figure 1:
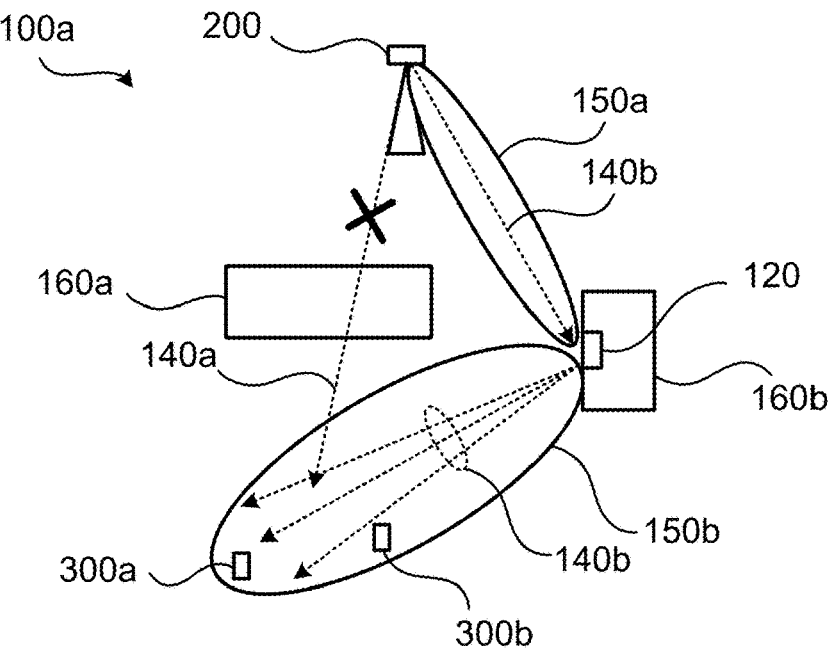
FIGS. 1 and 2 are schematic diagrams illustrating a communication network according to embodiments.
Figure 2:
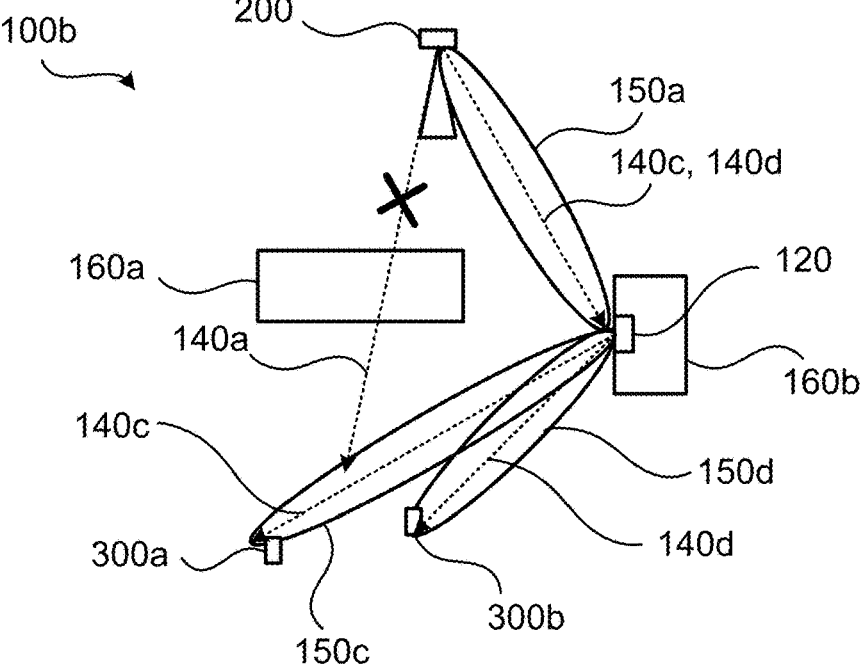

As a non-limiting example, assume that the network node 200 communicates with two user equipment; user equipment 300*a* and user equipment 300*b* at different times (T1, T2) via the meta-surface 120. Communication with the user equipment 300*a*, 300*b* takes place over a first frequency range (f1), whilst the network node 200 communicates with the controller 126, via transceiver unit 128, of the meta-surface 120 in control channel 180 over a second frequency range (f2) to control the reflection angle of the meta-surface 120. The reflection angle of the meta-surface 120 can be adapted for individual communication with each user equipment, such that communication is with user equipment 300*a* in communication channel 140*c* over f1 at T1 and communication is with user equipment 300*b* in communication channel 140*d* over f2 at T2, as in FIG. 2. At the beginning, however, assume that the network node 200 intends to perform simultaneous communication with both user equipment 300*a* and user equipment 300*b*. The network node 200 therefore configures, via control channel 180, the meta-surface 120 to reflect signals according to a first configuration (e.g., a broadcast mode). The configuration is such that the reflected signal has a wide coverage and may cover several user equipment 300*a*, 300*b*. The network node 200 transmits reference signals towards the user equipment 300*a*, 300*b* for the user equipment 300*a*, 300*b* to estimate the radio propagation channel The user equipment 300*a*, 300*b* then receive the reference signals, determine a channel quality estimate and compose a CQI report based on the channel quality estimate and the offset value, and send the CQI report to the network node 200. The network node 200, upon reception of the CQI reports, determines transmission settings for data transmission to at least one of the user equipment 300*a* 300*b*, and configures the meta-surface 120 with a second configuration. The reflection angle of the meta-surface 120 is adapted for individual communication with each user equipment, such that communication is with user equipment 300*a* in communication channel 140*c* over f1 at T1 and communication is with user equipment 300*b* in communication channel 140*d* over f2 at T2, as in FIG. 2.

Common for the above aspects is that compensation for configurations used by the meta-surface 120 is used as part of a channel information estimation procedure being performed between the network node 200 and the user equipment 300*a*, 300*b*. For example, the compensation might be realized in terms of a compensation indicator being an offset value to a CQI value to be reported by the user equipment 300*a*, 300*b* during the channel information estimation procedure. As disclosed above, the compensation is dependent on a difference in pathloss (or, equivalently, difference in received signal power density at the user equipment 300*a*, 300*b*) between the different configurations (such as the first configuration and the second configuration) applied at the meta-surface 120. As a non-limiting example, according to Friis's free space propagation formula, the relation between distance, d, and pathloss, PL, is:

$$PL \propto \frac{1}{d^2}$$

For a meta-surface 120, with distance d between the network node 200 and the meta-surface 120 and distance r between the meta-surface 120 and the user equipment 300*a*, 300*b* the relation becomes:

$$L \propto \frac{1}{d^2 r^2}$$

Figure 6:
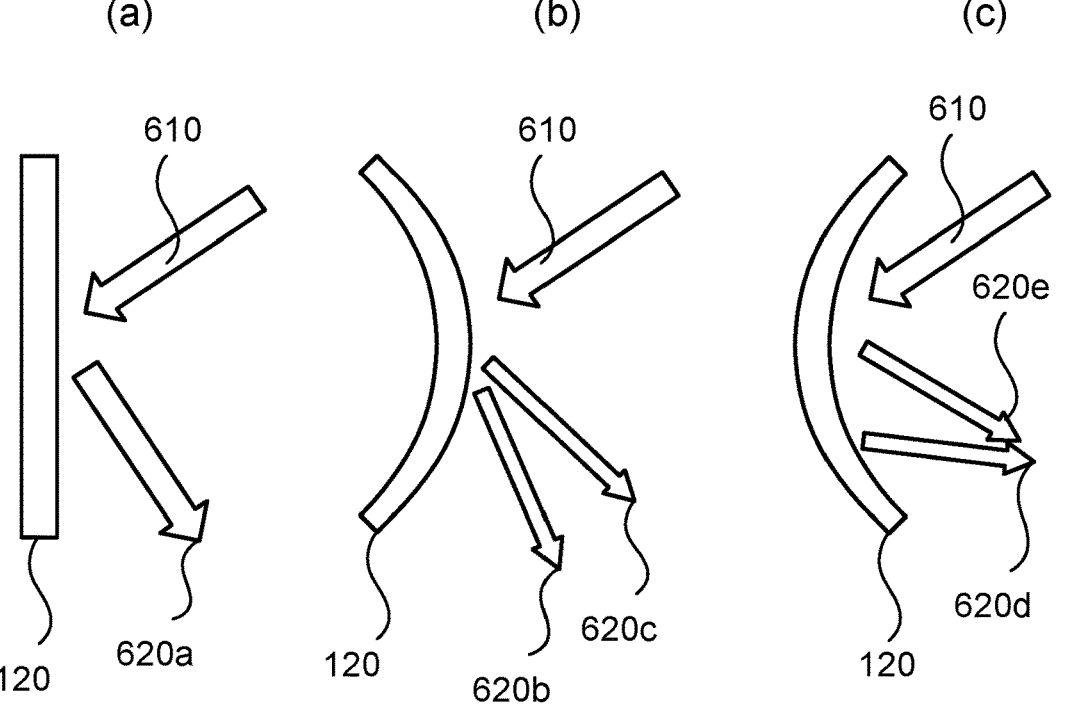
FIG. 6 is a schematic illustration of a meta-surface according to embodiments.

FIG. 6 is a schematic illustration of a meta-surface 120 according to embodiments, which at (a), (b), and (c) show different configurations, and thus reflection angles, of the meta-surface 120. In each of FIG. 6(*a*), FIG. 6(*b*), FIG. 6(*c*) an incoming wave illustrated by arrow 610 is reflected at the meta-surface 120, resulting in reflected waves illustrated by arrows 620*a*, 620*b*, 620*c*, 620*d*, 620*e*. It is here noted that whilst the meta-surface 120 appears to be physically bent in FIG. 6(*b*) and FIG. 6(*c*) this is for illustration only; the meta-surface 120 is not physically bent, but rather it is the settings of the individual antennas of the meta-surface 120 that are changed such that the reflection beam (i.e., the beam as reflected by the meta-surface 120) appears to be reflected by a bent surface. As a non-limiting example, in case the meta-surface 120 comprises antennas connected to resistors, inductors, and/or capacitors of which the electrical impedance is controllable, and where the antennas are connected to the resistors, inductors, and/or capacitors towards a ground plane, the reflection phase of each respective antenna can be adapted based on electrical impedance setting. Thus, by the controller 126 controlling the electrical impedances of the respective antennas, the reflection angle of an incoming electromagnetic wave can be adapted according to the generalized Snell's law For a planar reflection in a flat surface, as in FIG. 6(*a*), the beam directivity will not change from the reflection, i.e., the exponent remains unchanged, and hence the distance is the sum of the distance before and after the reflection. However, for a meta-surface 120 that is configured to appear convex, as in FIG. 6(*b*), or concave, as in FIG. 6(*c*), the relation may be generalized to:

$$L \propto \frac{1}{d^2 r^\beta}$$

For a meta-surface 120 that is configured to appear convex, i.e., to spread a wave in a broad beam (as represented by the combination of reflected waves 620*b*, 620*c*), as may be the case to achieve wide coverage, $\beta > 2$. For a meta-surface 120 that is configured to appear concave, i.e., to focus a wave in a narrow beam (as represented by the combination of reflected waves 620*d*, 620*e*), $\beta < 2$ up to the location of the reflector focus. With reference to the above, the notation $\beta_k$ might be used to denote the reflection factor for configuration k. In some embodiments the first configuration yields a wider coverage than the second configuration, and hence $\beta_1 > \beta_2$.

Hence, the differences in pathloss might be dependent on both the configuration of the meta-surface 120 (as dependent on β) and the distance between the user equipment 300*a*, 300*b* and the meta-surface 120 (as dependent on r). The configuration properties of the meta-surface 120 can be assumed to be known by the network node 200, either from capability signaling or by reading a file or by receiving information from other nodes in the network. Further, the distance between the meta-surface 120 and the network node 200 might also be assumed to be known (as well as the position of the network node 200 and the position of the meta-surface 120. The distance between the meta-surface 120 and the user equipment 300a, 300b should therefore be estimated. One method for estimating the distance between the meta-surface 120 and the user equipment 300a, 300b involves using the timing advance configuration value of the user equipment 300a, 300b. Alternatively, the position of the user equipment 300a, 300b can be estimated from cell triangulation or from a non-cellular positioning technique, e.g., by help of Global Navigation Satellite System (GNSS) measurements.

Figure 7:
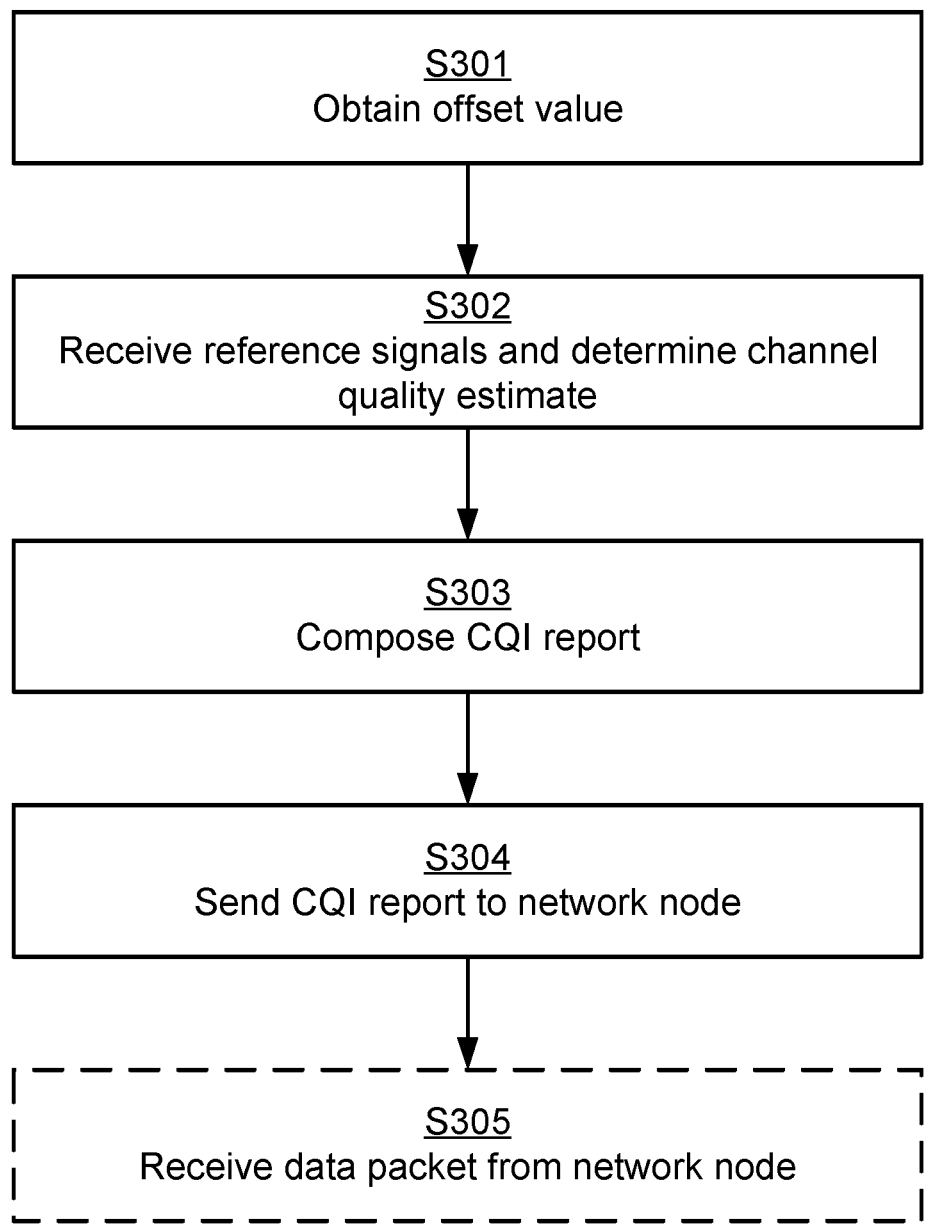

A first particular embodiment for performing a channel information estimation procedure based on at least some of the above disclosed embodiments will now be disclosed in detail with reference to the flowchart of FIG. 7.

S301: The user equipment 300a, 300b obtains the offset value.

S302: The user equipment 300a, 300b receives reference signals from the network node 200 and determine a channel quality estimate.

S303: The user equipment 300a, 300b composes a CQI report based on the channel quality estimate and the obtained offset value. For instance, the user equipment obtains a first CQI value related to the channel quality estimate and then applies the offset value to determine the CQI to be reported to the network node 200.

S304: The user equipment 300a, 300b sends the CQI report to the network node 200, e.g. at a preconfigured CQI report transmission time instant.

S305 (optional): The user equipment 300a, 300b receives a data packet from the network node 200, where the data packet has been transmitted using transmission settings based on the reported CQI.

Figure 8:
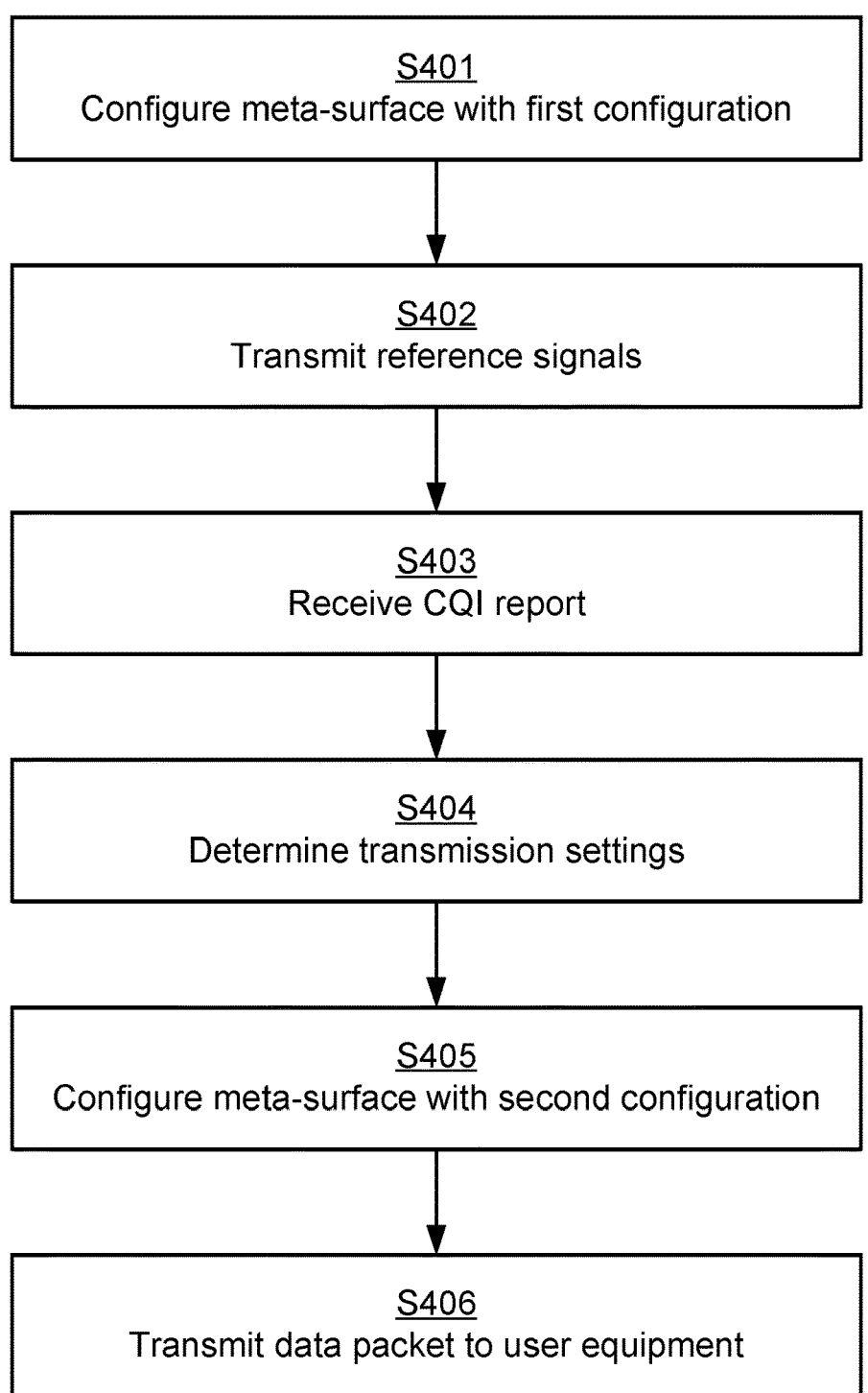

A second particular embodiment for performing a channel information estimation procedure based on at least some of the above disclosed embodiments will now be disclosed in detail with reference to the flowchart of FIG. 8.

S401: The network node 200 is to perform communication with user equipment 300a, 300b via a meta-surface 120. The network node 200 configures the meta-surface 120 with a first configuration, where the first configuration corresponds to a first reflection setting in the meta-surface 120.

S402: The network node 200 transmits reference signals

S403: The network node 200 receives a CQI report from the user equipment 300a, 300b, where the CQI report is determined by the user equipment based on the reference signals transmitted whilst the meta-surface 120 was configured with the first configuration.

S404: The network node 200, based on the CQI report and the first and a second meta-surface 120 configurations, determines transmission settings to use for transmitting a data packet to at least one of the user equipment 300a, 300b.

S405: The network node 200 configures the meta-surface 120 with a second configuration, where the second configuration sets the reflection angle of the meta-surface 120 to correspond to a particular user equipment 300a.

S406: The network node 200 transmit the data packet using the determined transmission settings to the user equipment 300a.

In a further particular embodiment, the embodiments related to FIG. 7 and FIG. 8 are combined, where the network node 200 sends an offset value to the user equipment 300a, 300b to (partly) adapt for the different configurations of the meta-surface 120, and then based on the CQI report, the offset value, and the first and second configurations of the meta-surface 120, determines transmission settings to use for the transmission of the data packet.

Figure 9:
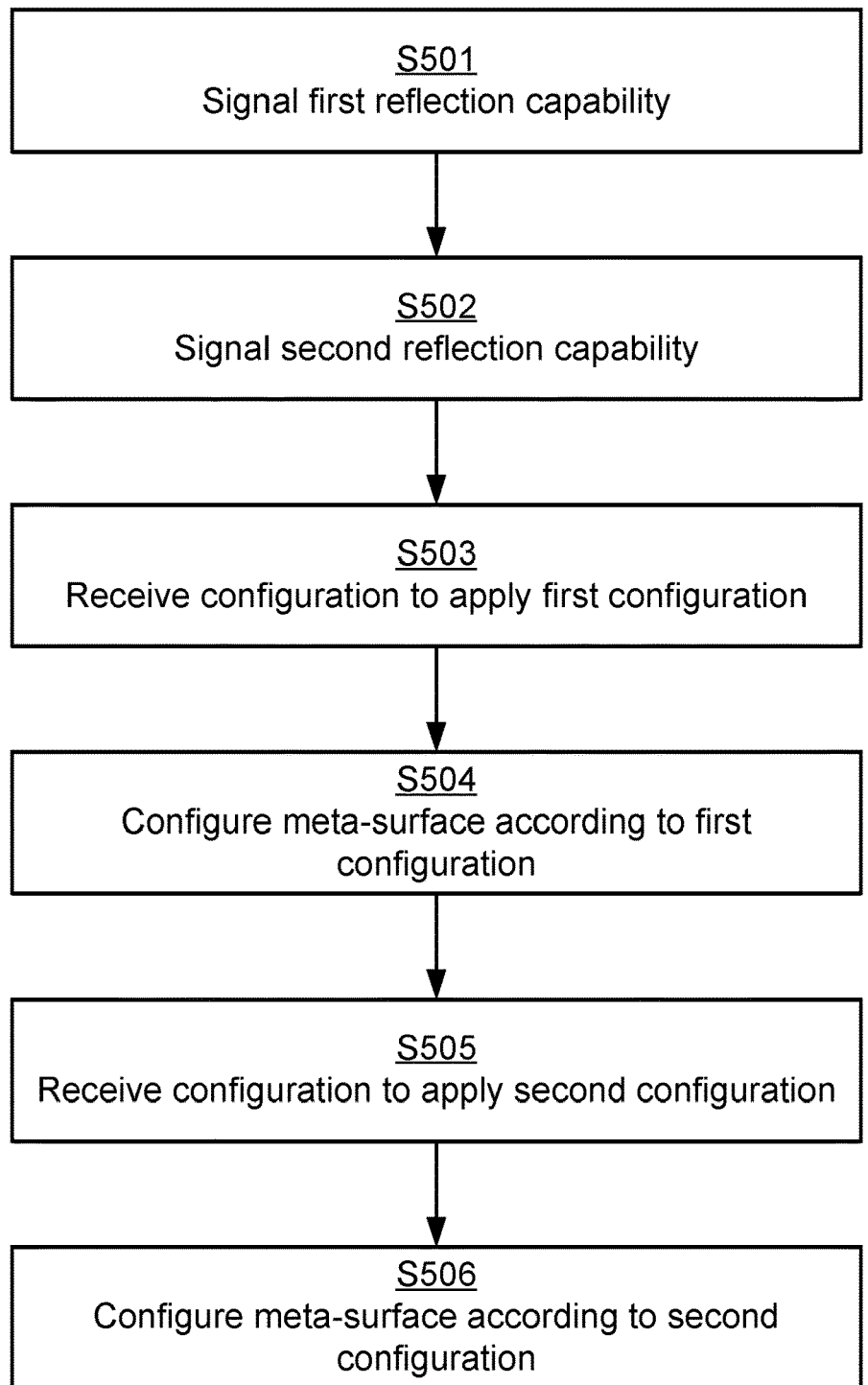

A third particular embodiment for performing a channel information estimation procedure based on at least some of the above disclosed embodiments will now be disclosed in detail with reference to the flowchart of FIG. 9. The embodiment of FIG. 9 is readily combinable with any of the embodiments in FIG. 7 and FIG. 8, respectively.

S501: The controller 126 signals, via the transceiver 128, a first reflection capability to the network node 200. The first reflection capability corresponds to the first configuration.

S502: The controller 126 signals, via the transceiver 128, a second reflection capability to the network node 200. The second reflection capability corresponds to the second configuration.

The first reflection capability and the second reflection capability may be related to reflection angles for respective communication modes, of the meta-surface 120, or a subset of the meta-surface 120, used for each respective communication mode.

S503: The controller 126 receives, via the transceiver 128, configuration from the network node 200 to apply the first configuration at a first time instant. The controller 126 might acknowledge reception of the configuration back to the network node 200.

S504: The controller 126 configures the meta-surface 120 according to the first configuration.

S505: The controller 126 receives, via the transceiver 128, configuration from the network node 200 to apply the second configuration at a second time instant. The controller 126 might acknowledge reception of the configuration back to the network node 200.

S506: The controller 126 configures the meta-surface 120 according to the second configuration.

Figure 10:
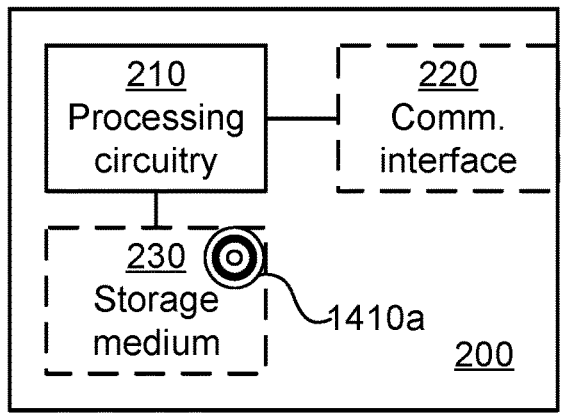
FIG. 10 is a schematic diagram showing functional units of a network node according to an embodiment.

FIG. 10 schematically illustrates, in terms of a number of functional units, the components of a network node 200 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410a (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other entities, functions, nodes, and devices, such as the user equipment 300a, 300b and the controller 126 (via transceiver 128). As such the communications interface 220 may comprise one or more transmitters and receivers, comprising analogue and digital components.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 11:
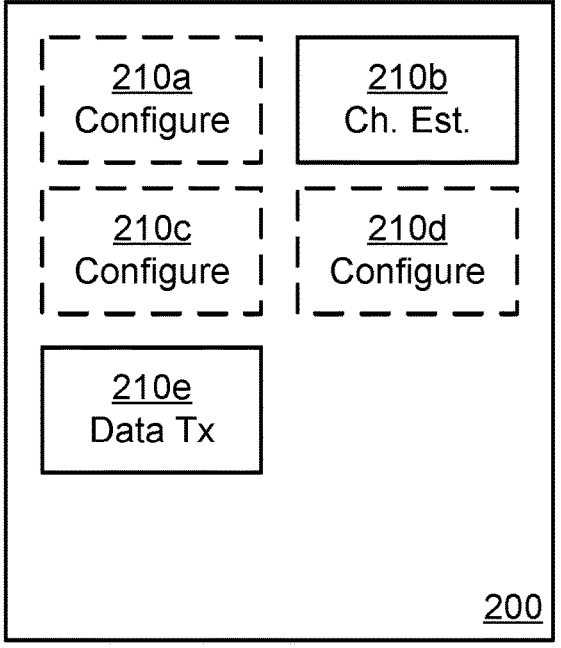
FIG. 11 is a schematic diagram showing functional modules of a network node according to an embodiment.

FIG. 11 schematically illustrates, in terms of a number of functional modules, the components of a network node 200 according to an embodiment. The network node 200 of FIG. 11 comprises a number of functional modules; a channel estimation module 210b configured to perform step S104, and a data transmission module 210e configured to perform step S108. The network node 200 of FIG. 11 may further comprise a number of optional functional modules, such as any of a configure module 210a configured to perform step S102, a configure module 210c configured to perform step S104a, and a configure module 210d configured to perform step S106. In general terms, each functional module 210a: 210e may be implemented in hardware or in software. Preferably, one or more or all functional modules 210a:210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a:210e and to execute these instructions, thereby performing any steps of the network node 200 as disclosed herein.

The network node 200 could be part of, integrated with, or collocated with, any of a (radio) access network node, radio base station, base transceiver station, node B (NB), evolved node B (eNB), gNB, access point, access node, or integrated access and backhaul (IAB) node.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 10 the processing circuitry 210 may be distributed among a plurality of devices, or nodes. The same applies to the functional modules 210a:210e of FIG. 11 and the computer program 1420a of FIG. 14.

Figure 12:
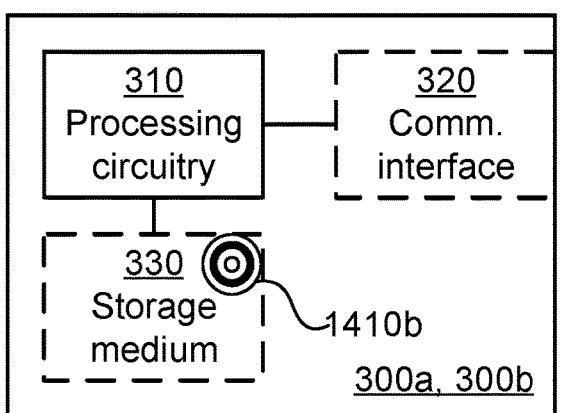
FIG. 12 is a schematic diagram showing functional units of a user equipment according to an embodiment.

FIG. 12 schematically illustrates, in terms of a number of functional units, the components of a user equipment 300a, 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1410b (as in FIG. 14), e.g. in the form of a storage medium 330. The processing circuitry 310 may further be provided as at least one application specific integrated circuit (ASIC), or field programmable gate array (FPGA).

Particularly, the processing circuitry 310 is configured to cause the user equipment 300a, 300b to perform a set of operations, or steps, as disclosed above. For example, the storage medium 330 may store the set of operations, and the processing circuitry 310 may be configured to retrieve the set of operations from the storage medium 330 to cause the user equipment 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The user equipment 300a, 300b may further comprise a communications interface 320 for communications with other entities, functions, nodes, and devices, such as the network node 200. As such the communications interface 320 may comprise one or more transmitters and receivers, comprising analogue and digital components.

The processing circuitry 310 controls the general operation of the user equipment 300a, 300b e.g. by sending data and control signals to the communications interface 320 and the storage medium 330, by receiving data and reports from the communications interface 320, and by retrieving data and instructions from the storage medium 330. Other components, as well as the related functionality, of the user equipment 300a, 300b are omitted in order not to obscure the concepts presented herein.

Figure 13:
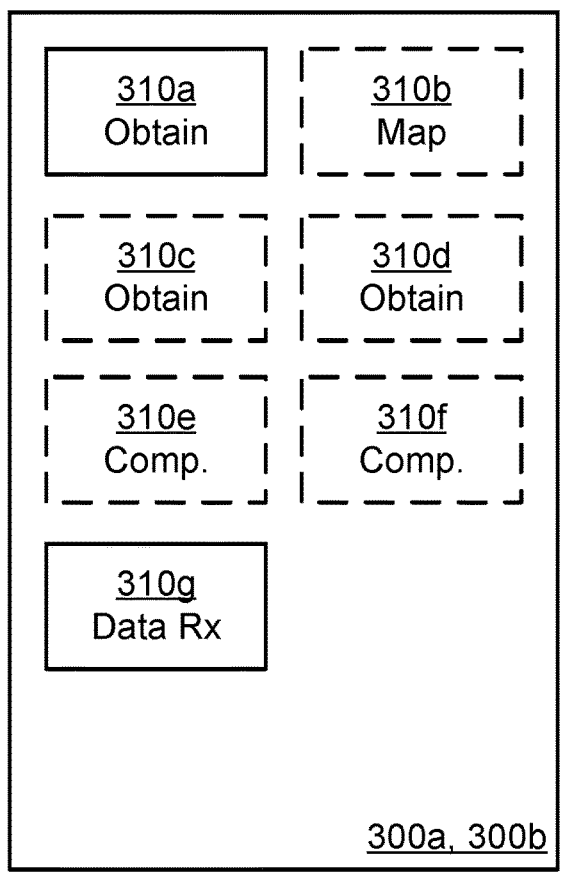
FIG. 13 is a schematic diagram showing functional modules of a user equipment according to an embodiment.

FIG. 13 schematically illustrates, in terms of a number of functional modules, the components of a user equipment 300a, 300b according to an embodiment. The user equipment 300a, 300b of FIG. 13 comprises a number of functional modules; an obtain module 310a configured to perform step S102, and a data reception module 310g configured to perform step S208. The user equipment 300a, 300b of FIG. 13 may further comprise a number of optional functional modules, such as any of a map module 310b configured to perform step S102b, an obtain module 310c configured to perform step S104a, an obtain module 310d configured to perform step S104b, a compensation module 310e configured to perform step S106a, and a compensation module 310f configured to perform step S106b. In general terms, each functional module 310a:310g may be implemented in hardware or in software. Preferably, one or more or all functional modules 310a:310g may be implemented by the processing circuitry 310, possibly in cooperation with the communications interface 320 and/or the storage medium 330. The processing circuitry 310 may thus be arranged to from the storage medium 330 fetch instructions as provided by a functional module 310a:310g and to execute these instructions, thereby performing any steps of the user equipment 300a, 300b as disclosed herein.

The user equipment 300a, 300b might be a wireless communication device, mobile phone, Internet-of-Things (IoT) device, network equipped sensor, network equipped vehicle, or wearable electronic device.

Figure 14:
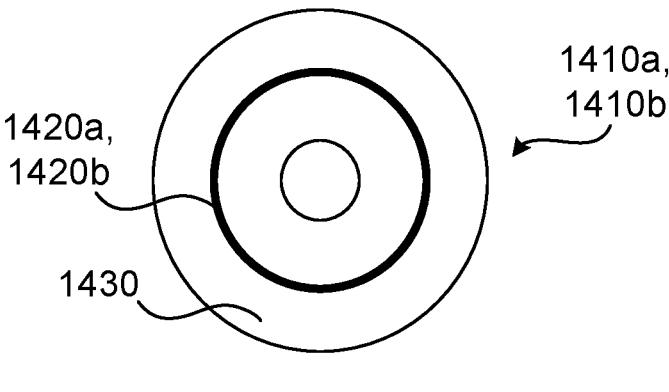
FIG. 14 shows one example of a computer program product comprising computer readable means according to an embodiment.

FIG. 14 shows one example of a computer program product 1410a, 1410b comprising computer readable means 1430. On this computer readable means 1430, a computer program 1420*a* can be stored, which computer program 1420*a* can cause the processing circuitry 210 and thereto operatively coupled entities and devices, such as the communications interface 220 and the storage medium 230, to execute methods according to embodiments described herein. The computer program 1420*a* and/or computer program product 1410*a* may thus provide means for performing any steps of the network node 200 as herein disclosed. On this computer readable means 1430, a computer program 1420*b* can be stored, which computer program 1420*b* can cause the processing circuitry 310 and thereto operatively coupled entities and devices, such as the communications interface 320 and the storage medium 330, to execute methods according to embodiments described herein. The computer program 1420*b* and/or computer program product 1410*b* may thus provide means for performing any steps of the user equipment 300*a*, 300*b* as herein disclosed.

In the example of FIG. 14, the computer program product 1410*a*, 1410*b* is illustrated as an optical disc, such as a CD (compact disc) or a DVD (digital versatile disc) or a Blu-Ray disc. The computer program product 1410*a*, 1410*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420*a*, 1420*b* is here schematically shown as a track on the depicted optical disk, the computer program 1420*a*, 1420*b* can be stored in any way which is suitable for the computer program product 1410*a*, 1410*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for performing a channel information estimation procedure, the method being performed by a network node, the network node serving a user equipment via a meta-surface over a radio propagation channel, the method comprising:
   performing the channel information estimation procedure, wherein the channel information estimation procedure involves compensation for configurations used by the meta-surface, and wherein the compensation pertains to estimation of channel quality of the radio propagation channel between the user equipment and the network node via the meta-surface, the compensation for the configurations used by the meta-surface comprises:
   configuring the user equipment with a compensation indicator to be used by the user equipment during the channel information estimation procedure, the meta-surface being of a type from a set of types, and the compensation indicator indicating which type the meta-surface is; and
   performing a data transmission over the radio propagation channel, the data transmission being performed with transmission settings as determined by the channel information estimation procedure.

2. The method according to claim 1, wherein the configurations comprise a first configuration and a second configuration, the method further comprising:

configuring the meta-surface with the first configuration, wherein the channel information estimation procedure is performed whilst the meta-surface is configured to use the first configuration; and
   configuring the meta-surface with the second configuration, wherein the data transmission is performed whilst the meta-surface is configured to use the second configuration.

3. The method according to claim 2, wherein the compensation is based on a difference between the first configuration and the second configuration.

4. The method according to claim 2, wherein the compensation pertains to a difference, with respect to the first configuration and the second configuration, in signal path-loss between the network node and the user equipment or in signal power density received by the user equipment.

5. The method according to claim 2, wherein the first configuration yields a first angular coverage of the meta-surface, wherein the first configuration yields a second angular coverage of the meta-surface, and wherein the first angular coverage is wider than the second angular coverage.

6. The method according to claim 1, wherein the compensation indicator is an offset value to a channel quality information, CQI, value to be reported by the user equipment during the channel information estimation procedure.

7. The method according to claim 6, wherein the offset value is dependent on signal pathloss between the network node and the user equipment.

8. The method according to claim 1, wherein performing the channel information estimation procedure involves application of a compensation factor to a value of a CQI report received from the user equipment during the channel information estimation procedure, and wherein the transmission settings are a function of the value of the CQI report as compensated by the compensation factor.

9. The method according to claim 1, wherein the transmission settings are any of: Modulation and Coding Scheme, MCS, rank, Signal to Noise Ratio, SNR, offset, beamforming parameters, precoding parameters, directivity parameters.

10. The method according to claim 1, wherein the configurations pertain to settings of reflection angle or gain factor of the meta-surface.

11. The method according to claim 1, wherein the network node is serving at least two user equipment via the meta-surface, and wherein the compensation is determined individually per user equipment.

12. A method for performing a channel information estimation procedure, the method being performed by a user equipment, the user equipment being served by a network node via a meta-surface over a radio propagation channel, the method comprising:
   obtaining, as part of performing the channel information estimation procedure with the network node, a compensation indicator to be used by the user equipment during the channel information estimation procedure, wherein the channel information estimation procedure involves compensation, based on the compensation indicator, for configurations used by the meta-surface, and wherein the compensation pertains to estimation of channel quality of the radio propagation channel between the user equipment and the network node via the meta-surface, the compensation for the configurations used by the meta-surface comprises:
   the meta-surface being of a type from a set of types, and the compensation indicator indicating which type the meta-surface is; and receiving a data transmission from the network node via the meta-surface.

13. The method according to claim 12, wherein the compensation indicator is an offset value to a channel quality information, CQI, value to be reported by the user equipment during the channel information estimation procedure.

14. The method according to claim 13, the method further comprising:

obtaining the CQI value from channel measurements performed during the channel information estimation procedure; and compensating the CQI value with the offset value before reporting the CQI value as compensated to the network node.

15. The method according to claim 12, the method further comprising: mapping the compensation indicator to an offset value; obtaining the CQI value from channel measurements performed during the channel information estimation procedure; and compensating the CQI value with the offset value before reporting the CQI value as compensated to the network node.

16. A network node for performing a channel information estimation procedure, the network node being configured to serve a user equipment via a meta-surface over a radio propagation channel, the network node comprising processing circuitry, the processing circuitry being configured to cause the network node to:

perform the channel information estimation procedure, wherein the channel information estimation procedure involves compensation for configurations used by the meta-surface, and wherein the compensation pertains to estimation of channel quality of the radio propagation channel between the user equipment and the network node via the meta-surface, the compensation for the configurations used by the meta-surface comprises:

configuring the user equipment with a compensation indicator to be used by the user equipment during the channel information estimation procedure, the meta-surface being of a type from a set of types, and the compensation indicator indicating which type the meta-surface is; and perform a data transmission over the radio propagation channel, the data transmission being performed with transmission settings as determined by the channel information estimation procedure.

17. A user equipment for performing a channel information estimation procedure, the user equipment being configured to be served by a network node via a meta-surface over a radio propagation channel, the user equipment comprising processing circuitry, the processing circuitry being configured to cause the user equipment to:

obtain, as part of performing the channel information estimation procedure with the network node, a compensation indicator to be used by the user equipment during the channel information estimation procedure, wherein the channel information estimation procedure involves compensation, based on the compensation indicator, for configurations used by the meta-surface, and wherein the compensation pertains to estimation of channel quality of the radio propagation channel between the user equipment and the network node via the meta-surface, the compensation for the configurations used by the meta-surface comprises:

the meta-surface being of a type from a set of types, and the compensation indicator indicating which type the meta-surface is; and receive a data transmission from the network node via the meta-surface.

* * * * *